(12) United States Patent
Hrsel et al.

(10) Patent No.: US 10,843,769 B2
(45) Date of Patent: Nov. 24, 2020

(54) BICYCLE PEDAL WITH A STOP

(71) Applicants: Karel Hrsel, Prague (CZ); Ales Wenzel, Prostejov (CZ)

(72) Inventors: Karel Hrsel, Prague (CZ); Martin Hrsel, Prague (CZ)

(73) Assignees: Karel Hrsel, Prague (CZ); Ales Wenzel, Prostejov (CZ)

( * ) Notice: Subject to any disclaimer, the term of this patent is extended or adjusted under 35 U.S.C. 154(b) by 0 days.

(21) Appl. No.: 16/000,545

(22) Filed: Jun. 5, 2018

(65) Prior Publication Data

US 2018/0346062 A1 Dec. 6, 2018

(30) Foreign Application Priority Data

Jun. 6, 2017 (CZ) .................................... 2017-323

(51) Int. Cl.
*B62M 3/08* (2006.01)
(52) U.S. Cl.
CPC .................................. *B62M 3/086* (2013.01)
(58) Field of Classification Search
CPC ........ B62M 3/086; B62M 3/083; B62M 3/08; A43B 5/14
See application file for complete search history.

(56) References Cited

U.S. PATENT DOCUMENTS

| | | | | |
|---|---|---|---|---|
| 3,964,343 A | * | 6/1976 | Lauterbach | B62M 3/086 74/594.6 |
| 4,538,480 A | * | 9/1985 | Trindle | A43B 5/14 24/697.1 |
| 4,596,163 A | * | 6/1986 | Bon | B62M 3/083 36/131 |
| 4,826,047 A | | 5/1989 | Heflin | |
| 4,827,797 A | * | 5/1989 | Le Faou | B62M 3/086 36/131 |
| 4,836,047 A | * | 6/1989 | Alcamo | B62M 3/086 36/131 |
| 4,936,164 A | * | 6/1990 | Forke | B62M 3/086 36/131 |
| 5,473,963 A | * | 12/1995 | Aeschbach | A43B 1/0054 36/131 |
| 5,704,256 A | * | 1/1998 | De Lattre | A43B 1/0054 36/131 |
| 5,724,752 A | * | 3/1998 | Lin | A43B 5/14 36/131 |

(Continued)

FOREIGN PATENT DOCUMENTS

| | | | | |
|---|---|---|---|---|
| DE | 3426103 A1 | * | 1/1986 | ............ B62M 3/086 |
| JP | 01297388 A | * | 11/1989 | ............ B62M 3/086 |
| WO | 2007046660 A1 | | 3/2017 | |

OTHER PUBLICATIONS

JPO Translation of the Description of JP 01297388 A, De Martin, Nov. 30, 1989. (Year: 2020).*

*Primary Examiner* — Daniel D Yabut
(74) *Attorney, Agent, or Firm* — WRB-IP LLP (57) ABSTRACT

The invention relates to a bicycle pedal (1) with a stop which is provided with a contact surface (14) with a groove (12) whose axis is parallel to the pedal (1) shaft (15) axis and the bicycle shoe stop is provided with a tongue (2), (31) corresponding to the groove (12). The tongue (2), (31) and groove (12) are preferably rectangular in shape. The shape of the contact surface (14) of the pedal (1) corresponds to the surface shape of the bicycle shoe sole.

12 Claims, 11 Drawing Sheets

(56) References Cited

U.S. PATENT DOCUMENTS

| | | | | |
|---|---|---|---|---|
| 9,545,972 B2* | 1/2017 | Williams | ............... | B62M 3/086 |
| 2002/0194951 A1* | 12/2002 | Lowe | ..................... | B62M 3/086 |
| | | | | 74/594.6 |
| 2006/0080865 A1* | 4/2006 | Chao | ........................ | A43B 5/14 |
| | | | | 36/131 |
| 2007/0094898 A1* | 5/2007 | Xie | ........................ | A43B 5/14 |
| | | | | 36/131 |
| 2009/0139369 A1 | 6/2009 | Takahama et al. | | |
| 2011/0219911 A1* | 9/2011 | Zoumaras | ................ | B62J 25/00 |
| | | | | 74/594.6 |
| 2013/0298428 A1* | 11/2013 | Tews | ...................... | A43B 3/246 |
| | | | | 36/134 |
| 2016/0304156 A1* | 10/2016 | Pepito | ................... | B62M 3/086 |

* cited by examiner

BICYCLE PEDAL WITH A STOP

BACKGROUND AND SUMMARY

The technical solution concerns a bicycle pedal with a stop, or a case—hereinafter a stop—attached to a bicycle shoe, especially for sports recreational cycling.

Nowadays bicycle platforms use platform pedals, which are equipped on both sides with a simple footplate of different sizes and different shapes. Their drawback is above all that the power transfer to the converter is very inefficient and also in most cases does not prevent the slip of the shoe, especially when wet. Their main advantage is easy to use from the point of view of the user, so they are most widely used.

There are also known pedals, at least one side of which is fitted with footplates with locks for bicycle shoes. These treading pedals eliminate the above-mentioned slip risks and, above all, significantly increase the efficiency of the power transfer to the converter. Their main drawback is the more or less complex tilting of the shoe at the start, and when stopping it is necessary to make some moves with a certain amount of force to release the shoe. If the user does not have sufficient training in releasing the pedal, it may occur that the shoe remains mounted on the pedal, which can cause the cyclist to fall in emergency situations such as sudden stops, etc.

Therefore, treading pedals are mainly used by professionals and racing cyclists, whereas amongst ordinary amateurs, their use is somewhat limited for the reasons mentioned above.

The aforementioned drawbacks are to a large extent removed by a bicycle pedal with a stop according to this technical solution. Its essence is that the bicycle pedal is provided with a treading seating, part with a grooved surface. The axis of this groove is in a parallel direction with the axis of the bicycle pedal shaft and a stop which is placed on the bicycle footwear and is equipped with a corresponding tongue.

In a preferred embodiment, the tongue and groove are rectangular in shape.

Preferably, the tongue is formed of a rigid material which is coated with a flexible elastomer to relieve the pressures on the groove and allows the desired slight deflection of the bicycle shoe in its longitudinal axis. The tongue may also be provided with overlaps that extend over one or both side walls to prevent slippage.

In another preferred embodiment, the pedal seat and sole of the bicycle shoe have the same shape, which is another element that provides better power transfer to the pedal and improves the stability of the stop in the pedal. Preferably, the pedal seat part may be provided with a leading element which makes it easier to insert the bicycle shoe into the pedal.

On the sides of the tongue, the bicycle shoe can be equipped with guides helping to simplify putting the tongue into the trunk.

In a preferred embodiment, the pedal at the end of its shaft has a seating surface on which the sole of the bicycle shoe abuts, which helps to improve the stability of the cyclist.

Preferably, the pedal is provided with a counterbalance that lies opposite the groove, ensuring that the pedal with the groove is always in such a position that the cyclist can quickly and comfortably slide the stop into the pedal.

in a preferred embodiment, the side walls of both the tongue and the groove are convex. The groove walls may be chamfered at the free end of the groove or may be provided with a flexible element for a stronger span of the tongue.

In a preferred embodiment, the tongue includes engaging elements to attach it to the sole of the bicycle shoe.

Summary of the main advantages of the bicycle pedal with stop according to this technical solution:
effective power transfer to the converter,
very good stability of shoe on the pedal,
simple stepping into the pedal,
very simple release of the pedal, entirely reflective in emergency situations
possibility to use for most MTBs—designated for mountain and trekking bikes, bicycle shoes as well as road bicycle shoes that are currently on the market—the pedal is therefore versatile for both types of bicycle shoes, only the corresponding type of stop is selected.

BRIEF DESCRIPTION OF THE DRAWINGS

The invention will be described in detail using the example embodiment on the attached drawings, where

FIGS. 6 to 8 illustrate the case type for the MTB shoe wherein the FIG. 6 case consists of a rectangular spring with openings for mounting to the MTB shoe, the FIG. 7 case is equipped with leading elements that allow a more precise placement of the shoe on the pedal and FIG. 8 illustrates the cross-section of the radius of the cylindrical surface that forms the rear face, i.e. the surface adjacent to the sole of the case shoe, and corresponding to the radius of the cylindrical surface on the sole of the bicycle shoe.

FIG. 21 1 illustrates the pedal in a perspective view.

DETAILED DESCRIPTION

Figure 1:
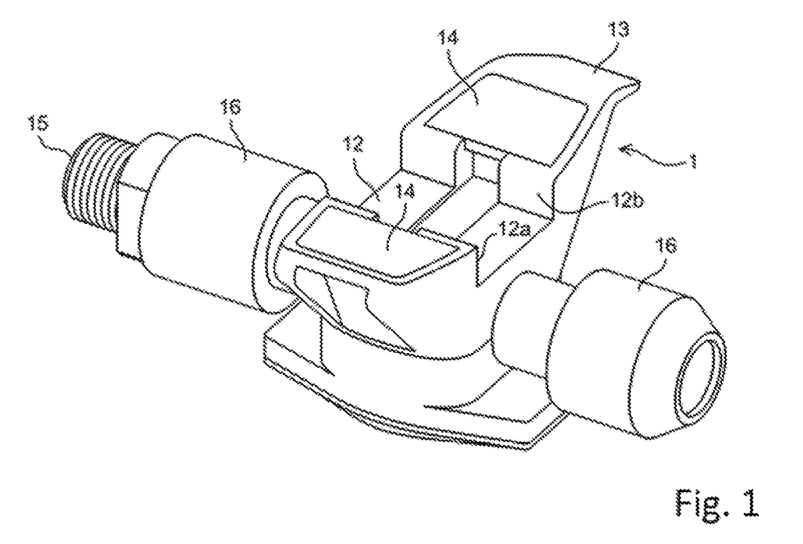
FIG. 1 illustrates the example pedal in a perspective view from above
Figure 2:
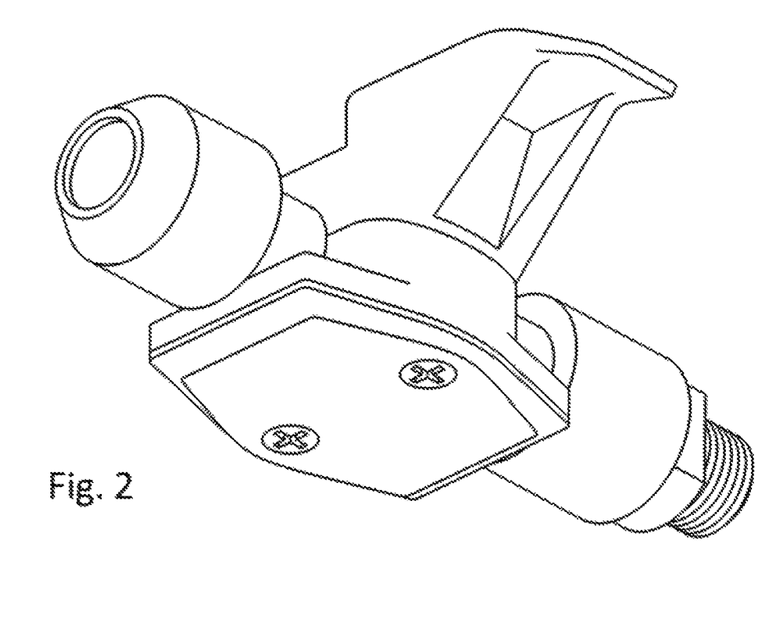
FIG. 2 illustrates the example pedal in a perspective view from below.
Figure 3:
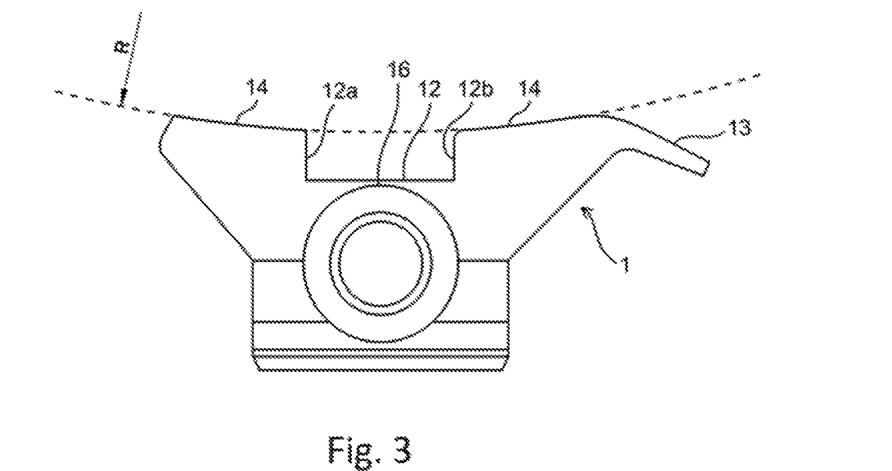
FIG. 3 illustrates the pedal with a groove in the side view.
Figure 4:
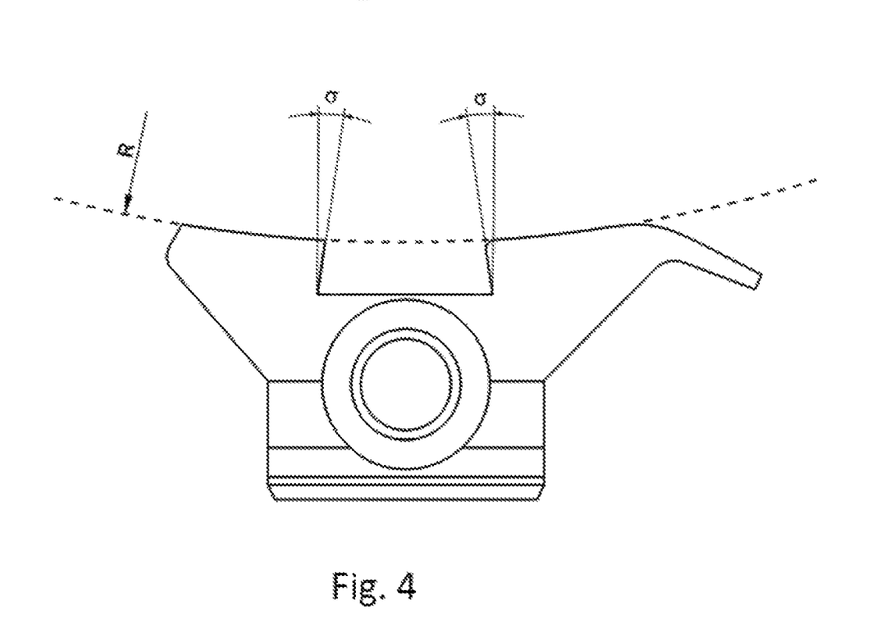
FIG. 4 illustrates another shape of the groove in the side view.
Figure 5:
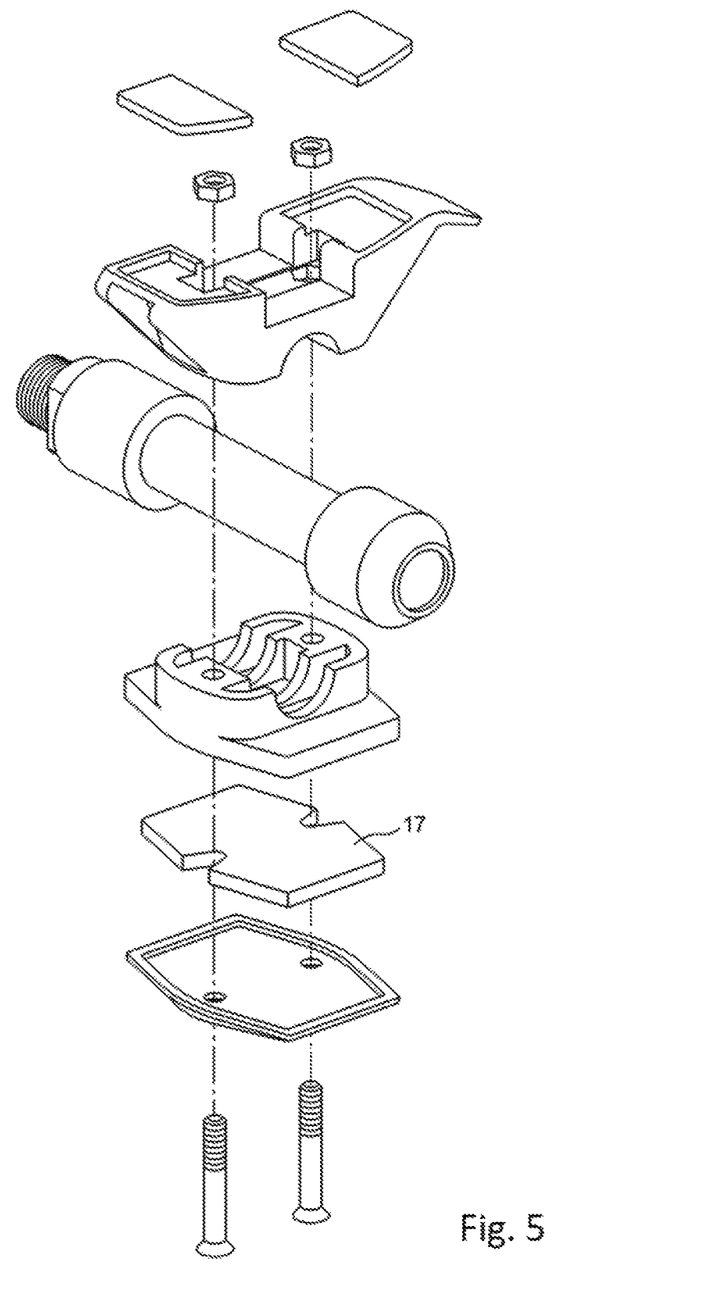
FIG. 5 illustrates a disassembled bicycle pedal.
Figure 6:
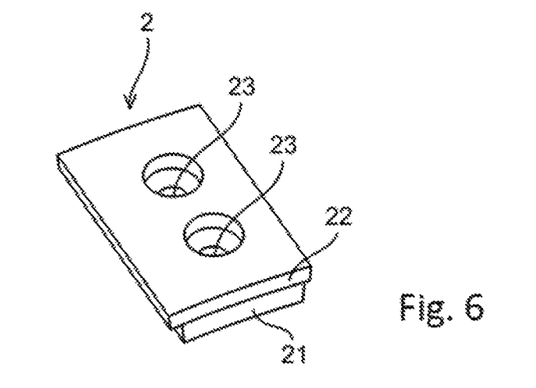
Figure 7:
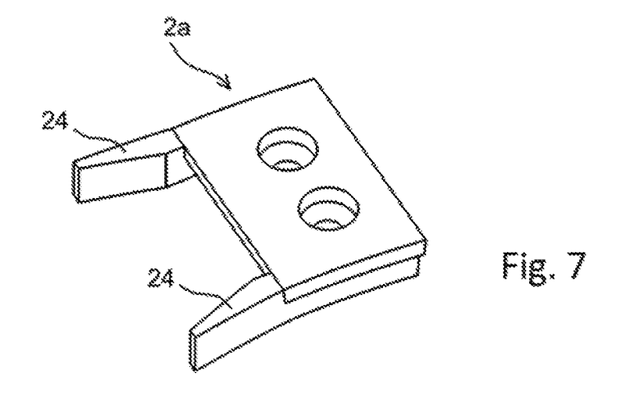
Figure 8:
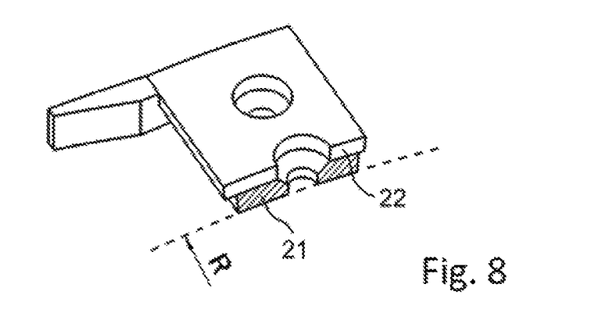
Figure 9:
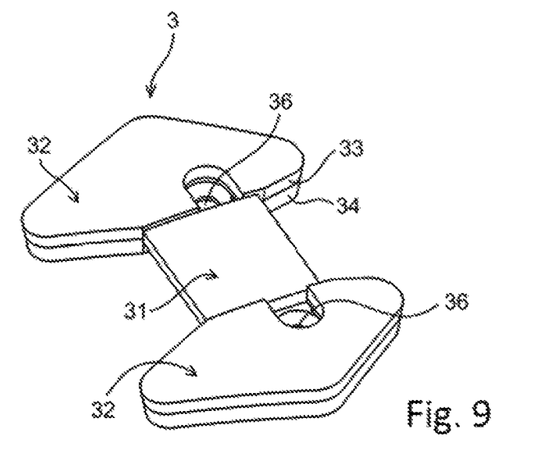
FIGS. 9 to 11 illustrate the case for the road bicycle shoes.
Figure 10:
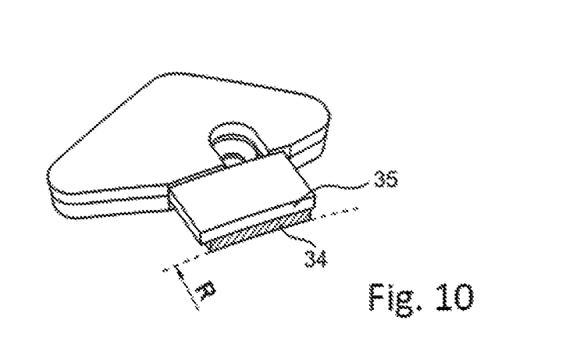
Figure 11:
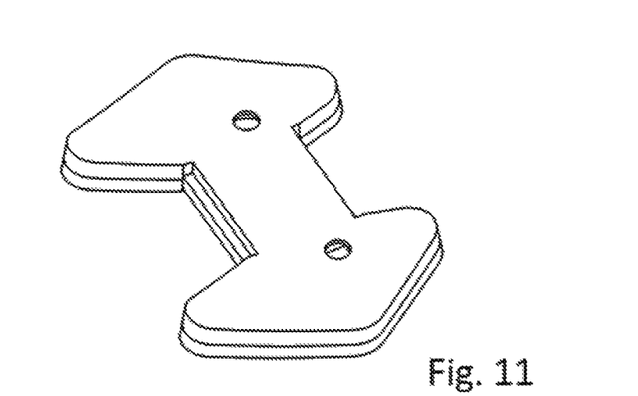
Figure 12:
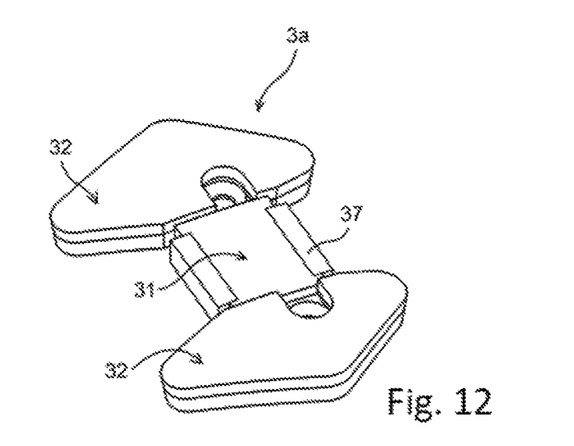
FIGS. 12 to 14 illustrate the case for the road bicycle shoe, where the flexible elastomer layer in the case tongue is removable.
Figures 13, 14:
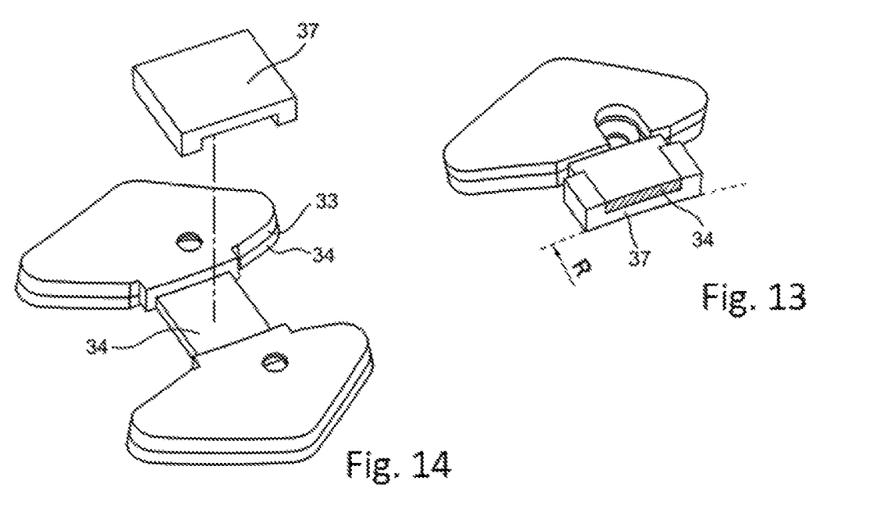
Figure 15:
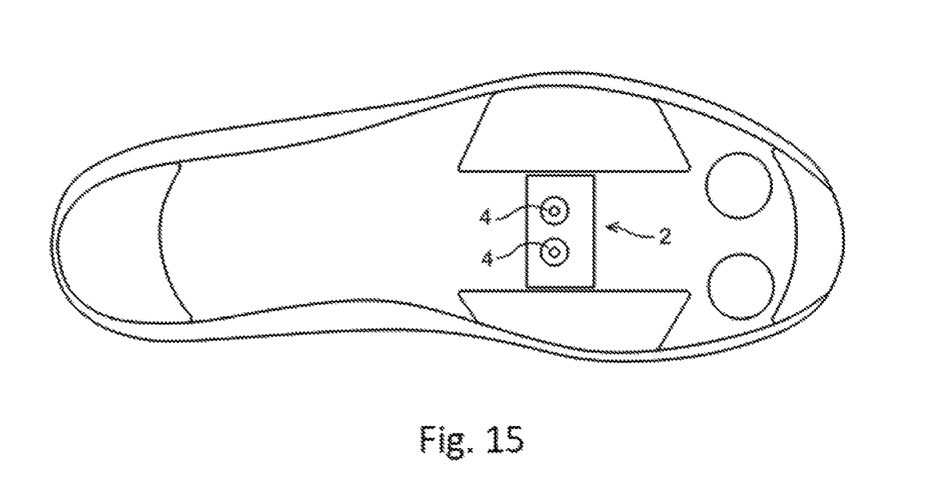
FIG. 15 illustrates the MTB shoe of the bicycle shoe with the option of mounting the case.
Figure 16:
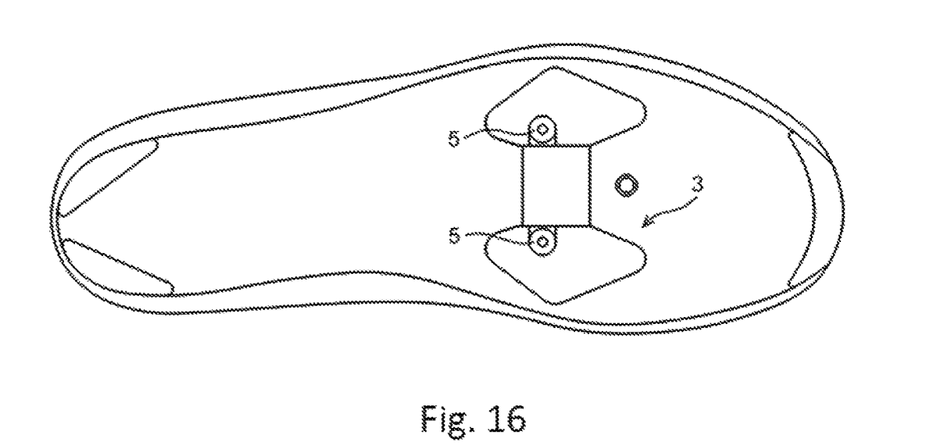
FIG. 16 illustrates the sole of a road bicycle shoe with the option of mounting the case.
Figure 17:
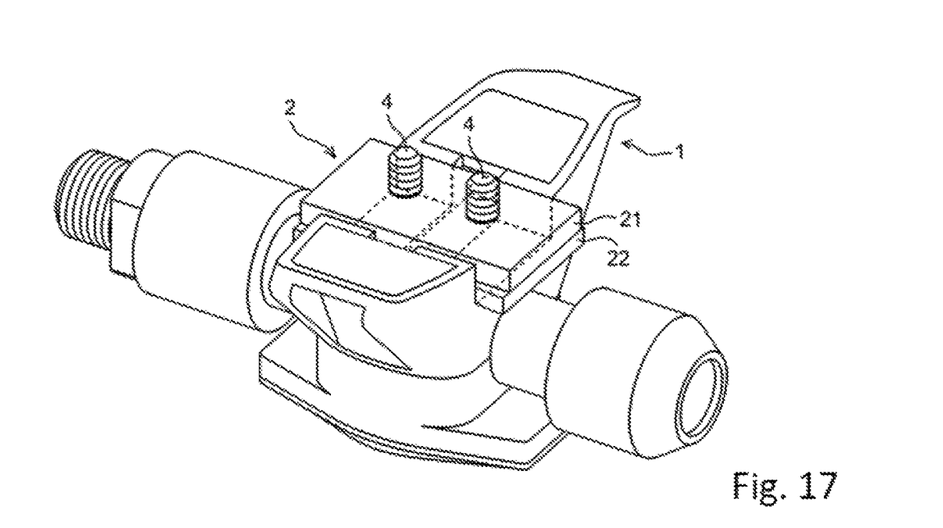
FIGS. 17 and 18 illustrate the case in the pedal in a perspective view and FIGS. 19 and 20 show a plan view of possible deviations of the case in the pedal.
Figure 18:
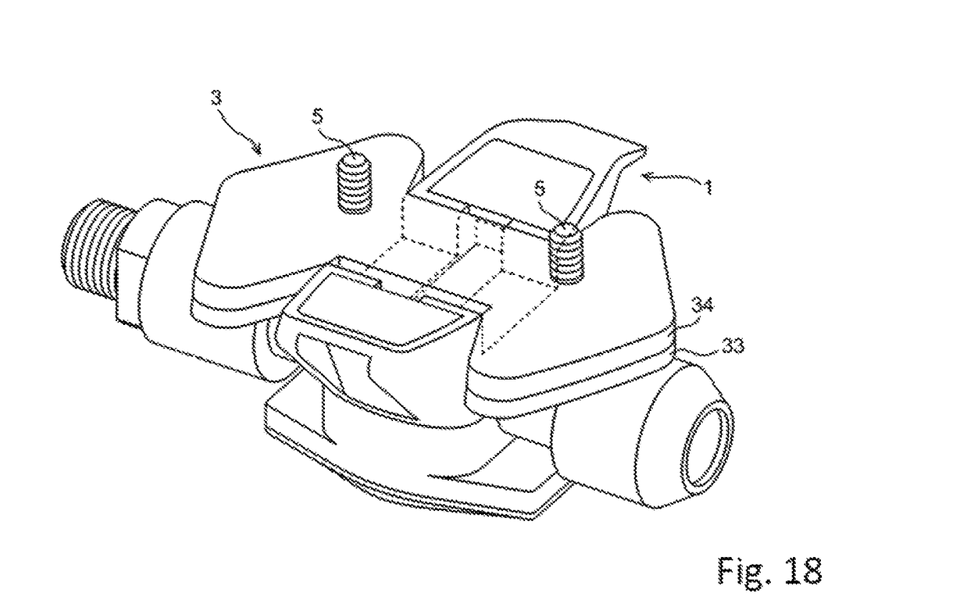
Figure 19:
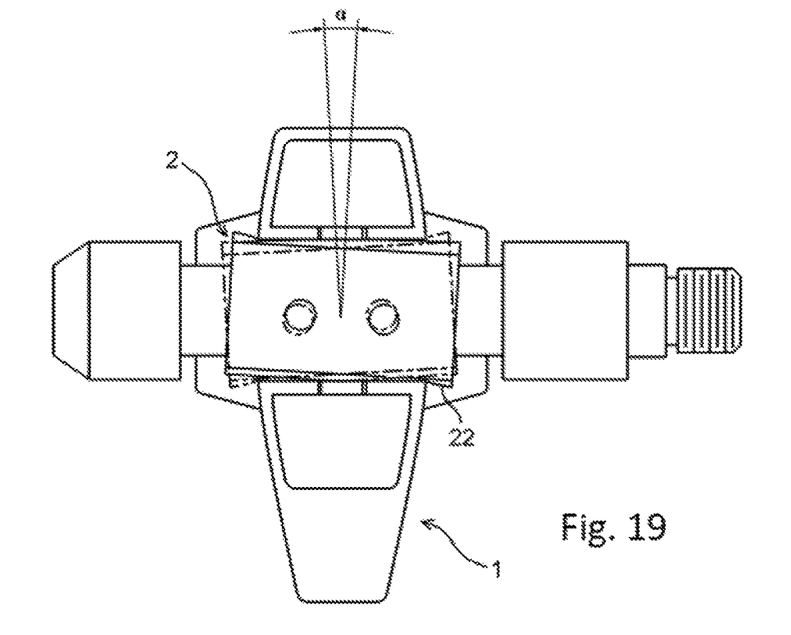
Figure 20:
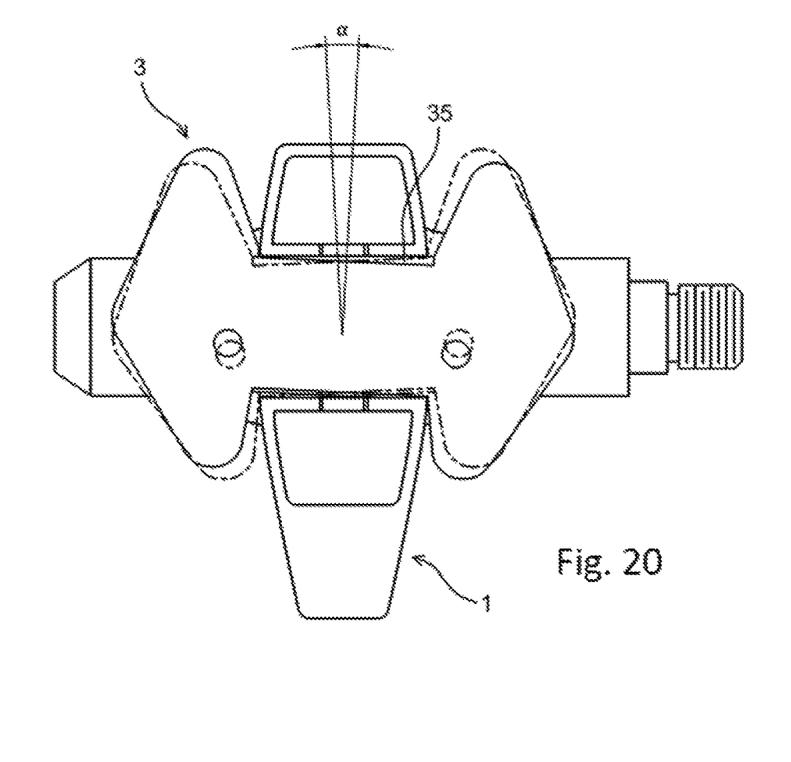
Figure 21:
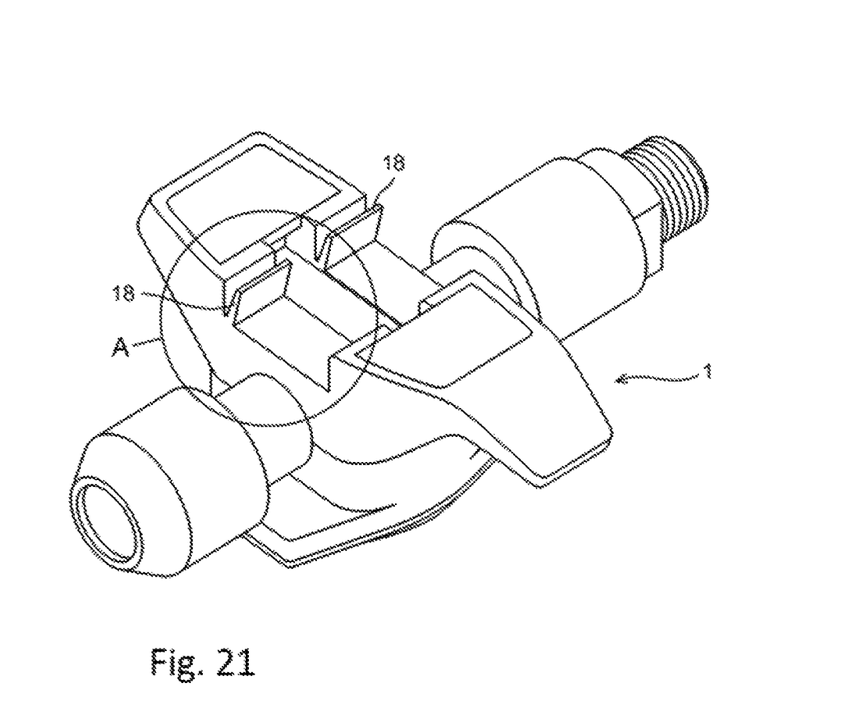
Figure 22:
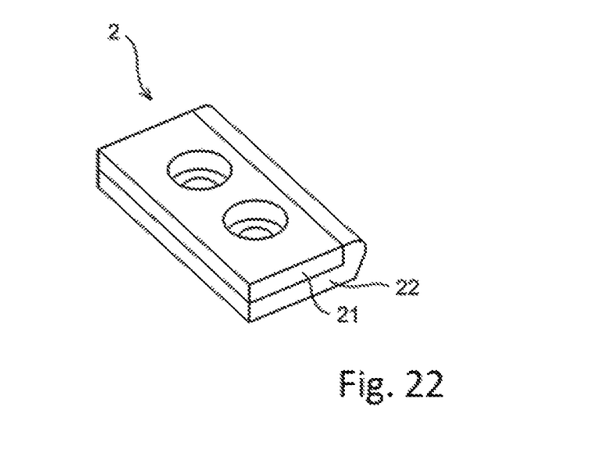
FIG. 22 illustrates the case in a perspective view.
Figure 23:
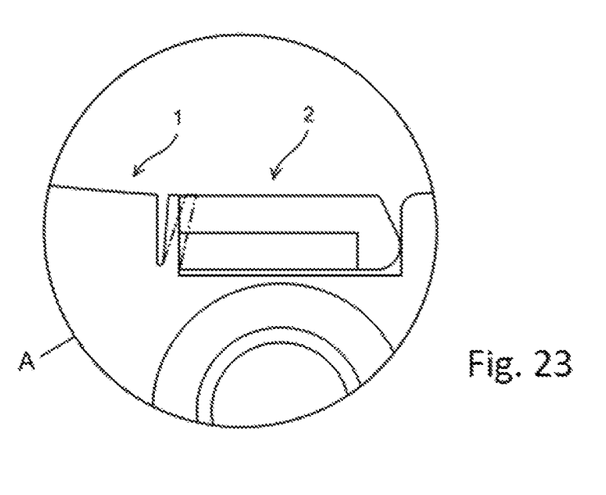
FIG. 23 illustrates the pedal cross-section.

The example bicycle pedal 1 is provided with a seating surface 14 with a groove 12, the axis of which is parallel with the axis of the shaft 15 of the pedal and the case of the bicycle shoe consist of the tongue 2 corresponding, to the groove 12. The tongue 2 and groove 12 are rectangular in shape. The tongue 2 consist of a fixed pad 21 and a surface layer 22 of a flexible elastomer. The flexible layer 22 overlaps, by 5 to 10%, the fixed pad 21 on the front and/or on the rear edge. The transverse dimension of the flexible layer 22 is further greater than or equal to the transverse dimension of the groove 12 at the points of contact 12a, 12b of the flexible layer 22 with the groove 12. At a hardness of the flexible layer in the range of 60 to 80° Sh, the corresponding increase in the stated dimension is preferably in the range of 2 to 5%. This arrangement of the flexible layer 22 creates a stable contact of the tongue and the groove, allow fur the desired slight deflection of the tongue in the groove and thus also of the bicycle shoe in the pedal, and allows for very simple release of the shoe from the pedal. The case is further provided with openings 23 for the engaging elements 4, 5—usually screws, for connection to the bicycle shoe.

The shape of the bottom surface, i.e. the surface which is in contact with the bicycle shoe, pads 21 and the shape of the seating surface 14 of pedal 1 corresponds to the shape of the surface of the bicycle shoe sole. The seating surface 14 of pedal 1 is provided with a leading element 13. Pedal 1 may be provided at the ends of the busing of the shaft 15 with seating surfaces 16 for the bicycle shoe sole. The seating surfaces 16 increase the overall stability of the shoe in the pedal. Preferably, pedal 1 is provided on the opposite side from the groove 12 with a counterbalance 17.

In another embodiment, the example case 2a is provided with leading elements 24 for more precise placement, i.e. better centering of the case 3 in pedal 1.

In another embodiment, the example case 3 for a road bicycle shoe consists of a tongue 31 and side parts 32. The inner walls of the side parts 32 create leading surfaces for simple and precise placement of the tongue 31 into the groove 12 of pedal 1. The bottom layer of the case consists of a fixed pad 34, with flexible layers 33, 35. The case 3 is provided with openings 36 for engaging elements, usually screws, for connection to the bicycle shoe. The shape of the bottom surface, i.e. the surface in contact with the bicycle shoe, pad 34 corresponds to the shape of the surface of the bicycle shoe sole.

In another embodiment, the example case 3a for a road bicycle shoe, in the location of the tongue 31 provided with a removable flexible part 37. This makes it possible to change the amount of shoe deflection in the pedal 1 and the pulling force of the shoe from the pedal only by replacing the flexible part 37.

The bicycle pedal with a stop according to this technical solution can be used especially in recreational, sport-recreational cycling and the like.

The invention claimed is:

1. A bicycle pedal with a bicycle shoe cleat, comprising the pedal, the pedal being provided with a contact surface with a groove having an axis that is parallel to a pedal shaft axis, and
the bicycle shoe cleat is provided with a fixing body comprising a fixed pad and a layer of a flexible elastomer, wherein a dimension of the flexible elastomer layer in a transverse direction perpendicular to the pedal shaft axis is greater than or equal to a dimension of the groove in the transverse direction.

2. The bicycle pedal with the bicycle shoe cleat according to claim 1, wherein the groove is rectangular in shape.

3. The bicycle pedal with the bicycle shoe cleat according to claim 1, wherein the fixing body consists of a fixed pad and a removable flexible part.

4. The bicycle pedal with the bicycle shoe cleat according to claim 1, wherein the contact surface of the pedal is provided with leading element.

5. The bicycle pedal with the bicycle shoe cleat, according to claim 1, wherein guide side elements are attached to sides of the fixing body.

6. The bicycle pedal with the bicycle shoe cleat according to claim 1, wherein the pedal comprises a shaft including a bushing and seating surfaces for a bicycle shoe sole are provided at ends of the bushing.

7. The bicycle pedal with the bicycle shoe cleat according to claim 1, wherein the pedal comprises a counterbalance on a side of the pedal opposite the groove.

8. The bicycle pedal with the bicycle shoe cleat according to claim 1, wherein a wail of the groove is provided with a flexible element.

9. The bicycle pedal with the bicycle shoe cleat according to claim 1, wherein the fixing body is provided with engaging elements kir connection to a bicycle shoe and a shape of the contact surface corresponds to a shape of a surface of the bicycle shoe sole.

10. The bicycle pedal with the bicycle shoe cleat according to claim 1, wherein walls of the groove arc beveled and converge toward each other on an open side of the groove.

11. The bicycle pedal with the bicycle shoe cleat according to claim 1, wherein the fixing body and the groove mate to form a tongue and groove connection.

12. The bicycle pedal with the bicycle shoe cleat according to claim 1, wherein walls of the groove define corners that are parallel to the axis of the pedal Shaft.

* * * * *